Sept. 21, 1965 J. K. BERGER 3,207,925
ELECTRONIC DIGITAL COMPUTER CLOCK READ AMPLIFIER
Filed June 13, 1962
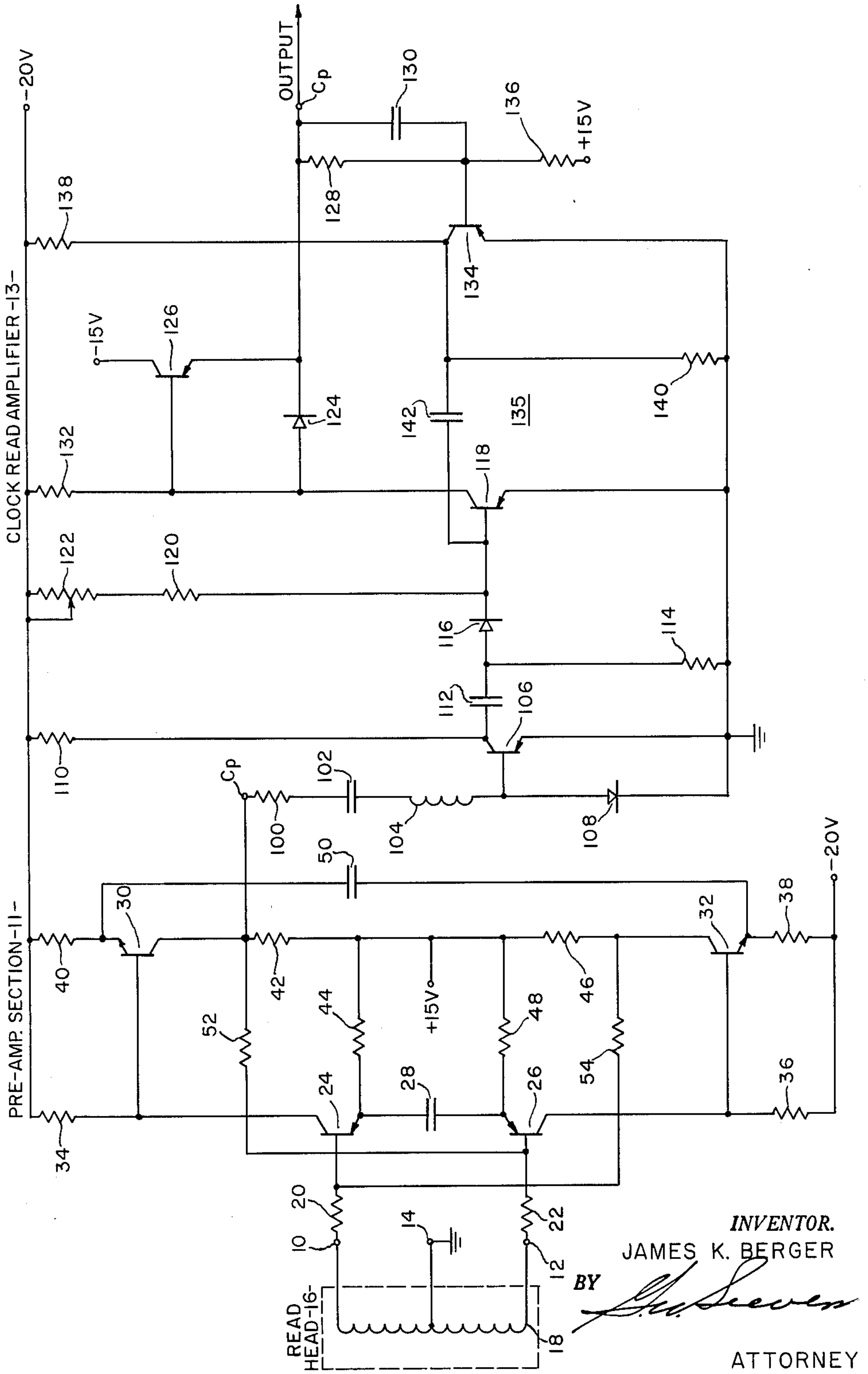
INVENTOR.
JAMES K. BERGER
BY
ATTORNEY United States Patent Office 3,207,925
Patented Sept. 21, 1965

3,207,925
ELECTRONIC DIGITAL COMPUTER CLOCK READ AMPLIFIER

James K. Berger, Beverly Hills, Calif., assignor to General Precision, Inc., a corporation of Delaware Filed June 13, 1962, Ser. No. 202,287
4 Claims. (Cl. 307—88.5)

The present invention relates to electronic digital computers of the movable magnetic memory type, and it relates more particularly to an improved read amplifier for use in such a computer for responding to clock signals read from the magnetic memory drum, tape or disc included in the computer, and for providing amplified sharp discrete clock pulses in response thereto.

It is usual in digital computers of the movable magnetic memory type to provide a track, or channel on the memory having regularly spaced recorded signals thereon which are used to control the development of clock signals which, in turn, are utilized for timing purposes throughout the computer.

The provision of clock signals recorded directly on the movable magnetic memory assures that all the circuitry and components of the computer will be synchronized with the information read from the memory. That is, such an arrangement tolerates variations in memory speed, because such variations do not adversely affect the over-all timing of the computer.

It is required in the usual electronic digital computer circuitry that the clock pulses be in the form of sharp discrete pulses, so that they may be used for triggering or other purposes. The clock signals, as usually read from the magnetic memory, however, inherently have a sinusoidal, rather than a rectangular pulse shape.

It is, accordingly, an object of the present invention to provide an improved amplifier for use in an electronic digital computer for amplifying clock signals read from a movable magnetic memory in the computer, and for converting the signals into sharp, discrete pulses.

Another object of the invention is to provide such an improved amplifier circuit which discriminates against noise signals, and the like, which would otherwise tend to produce spurious timing variations in the output clock pulses from the amplifier.

Still another object of the invention is to provide such an improved amplifier circuit which is capable of discriminating against noise signals, and yet which is capable of responding to slight frequency changes in the clock signals read from the memory, caused by slight memory speed variations, and of producing corresponding variations in the frequency of the output clock pulses without attenuating the signals amplified thereby.

Other objects and advantages of the invention will become apparent from a consideration of the following specification, when the specification is considered in conjunction with the single figure which represents a circuit diagram of a clock signal read amplifier constructed in accordance with the invention.

The clock signal read amplifier circuit illustrated herein includes a pair of input terminals 10 and 12, and a grounded input terminal 14. The amplifier circuit is coupled to a usual read head 16 which, in turn, includes a typical winding 18. The winding 18 is connected across the input terminals 10 and 12, and it includes a center tap which is connected to the grounded input terminal 14.

The read head 16 is positioned in usual manner to be magnetically coupled to the magnetic memory of the associated computer. This memory, as mentioned above, may be a movable drum, disc or tape; and the read head is positioned to sense regularly-spaced magnetic clock recordings in a particular track or channel on the memory medium.

The input terminals 10 and 12 are connected through respective resistors 20 and 22 to the base electrodes of corresponding PNP transistors 24 and 26. The resistors 20 and 22 may, for example, each have a resistance of 2.4 kilo-ohms.

The emitters of the PNP transistors 24 and 26 are inter-coupled through a capacitor 28. The capacitor 28 may, for example, have a capacity of .1 microfarad. The collectors of the transistors 24 and 26 are respectively connected to the base electrodes of a pair of NPN transistors 30 and 32, and to respective resistors 34 and 36. These resistors are connected to the negative terminal of a 20-volt direct voltage source, and each may have a resistance, for example, of 2.4 kilo-ohms.

The emitters of the NPN transistors 30 and 32 are connected to respective resistors 38 and 40. These latter resistors are also connected to the negative terminal of the 20-volt direct voltage source, and each may have a resistance, for example, of 2 kilo-ohms.

The collector of the transistor 30 is connected to a resistor 42 which, in turn, is connected to the positive terminal of a 15-volt direct voltage source. The emitter of the transistor 24 is connected through a resistor 44 to the positive terminal of that source. Each of the resistors 42 and 44 may have a resistance, for example, of 7.5 kilo-ohms.

In like manner, the collector of the transistor 32 is connected to a resistor 46, and the emitter of the transistor 26 is connected to a resistor 48, these latter resistors also being connected to the positive terminal of the 15-volt direct voltage source, and each having a resistance of, for example, 7.5 kilo-ohms.

The emitter of the transistor 30 is inter-coupled with the emitter of the transistor 32 through a capacitor 50 which may, for example, have a capacity of .1 microfarad. The collector of the transistor 30 is connected back to the base of the transistor 26 through a feedback resistor 52, and the collector of the transistor 32 is connected back to the base of the transistor 24 through a similar feedback resistor 54. Each of the resistors 52 and 54 may have a resistance, for example, of 560 kilo-ohms.

The transistors 24, 26, 30 and 32 form a two-stage, push-pull degenerative pre-amplifier section 11 for the illustrated amplifier circuit. The collector of the transistor 30 is connected to the input terminal $c_p$ of a subsequent section of the circuit, designated the clock read amplifier 13.

The input terminal $c_p$ is connected to a resistor 100 which, in turn, in connected to a capacitor 102. The capacitor 102 is connected through an inductance coil 104 to the base of a PNP transistor 106. The resistor 100 may, for example, have a resistance of 3.6 kilo-ohms. The capacitor 102 and inductance coil 104 form a series-resonant tuned network. The capacitor 102 may, for example, have a capacity of 150 micro-microfarads, and the inductance coil 104 may have an inductance of 20 millihenries.

A diode 108 has its anode connected to the base of the transistor 106. The cathode of the diode 108, and the emitter of the transistor 106 are both grounded. The collector of the transistor 106 is connected through a resistor 110 to the negative terminal of the 20-volt direct voltage source, and the collector is also connected to a capacitor 112. The resistor 110 may, for example, have a resistance of 2 kilo-ohms, and the capacitor 112 may have a capacity, for example, of 680 micro-microfarads.

The capacitor 112 is connected to a grounded resistor 114 and to the anode of a diode 116. The capacitor 112 and resistor 114 form a differentiating network. The resistor 114 may, for example, have a resistance of 470 ohms. The cathode of the diode 116 is connected to the base of a PNP transistor 118 and to a resistor 120. The resistor 120 is connected to a potentiometer 122 which, in turn, is connected to the negative terminal of the 20-volt direct voltage source. The resistor 120 may, for example, have a resistance of 10 kilo-ohms, and the potentiometer 122 may also have a resistance of 10 kilo-ohms.

The transistor 118 has its emitter connected to ground, and the collector of the transistor is connected to the anode of a diode 124 and to the base of a PNP transistor 126. The collector of the transistor 126 is directly connected to the negative terminal of the 15-volt direct voltage source.

The cathode of the diode 124, and the emitter of the transistor 126 are both connected to a resistor 128 which is shunted by a capacitor 130. The resistor 128 may, for example, have a resistance of 15 kilo-ohms, and the capacitor 130 may, for example, have a capacity of 120 micro-microfarads. The base of the transistor 126 is connected through a resistor 132 to the negative terminal of the 20-volt direct voltage source. The resistor 132 may, for example, have a resistance of 1 kilo-ohm.

The resistor 128 is connected to the base of a PNP transistor 134, and the resistor 128 is connected through a resistor 136 to the positive terminal of the 15-volt direct voltage source. The resistor 136 may, for example, have a resistance of 56 kilo-ohms. The emitter of the transistor 134 is grounded, and the collector of the transistor is connected through a resistor 138 to the negative terminal of the 20-volt direct voltage source. The resistor 138 may, for example, have a resistance of 2 kilo-ohms.

The collector of the transistor 134 is further connected to a grounded resistor 140 and through a capacitor 142 back to the base of the transistor 118. The resistor 140 may, for example, have a resistance of 1.5 kilo-ohms, and the capacitor 142 may have a capacity of 680 micro-microfarads. The emitter of the transistor 126 is further connected to an output terminal designated $C_p$, at which clock pulses, also designated $C_p$, are produced.

The pre-amplifier section 11 of the amplifier illustrated in the drawing provides a stable voltage gain of the order, for example, of 230.

As illustrated, the winding 18 of the read head 16 is connected across the input terminals 10 and 12 of the pre-amplifier section 11, and the center tap of the winding 18 is grounded by way of the input terminal 14. The read head 16 applies, therefore, a pair of sinusoidal oppositely-phased clock signals to the pre-amplifier section. These oppositely-phased input clock signals have an essentially sinusoidal waveform, and they have a frequency of, for example, 80 kilocycles. The amplitude of the input clock signals may, for example, be of the order of 100–300 millivolts peak-to-peak.

The pre-amplifier section 11 of the illustrated amplifier circuit consists of two class A, push-pull transistor-amplifier stages. The transistors of each of the amplifier stages are connected as differential amplifiers in push-pull, and the stages are directly coupled to cascade. The feedback resistors 52 and 54 provide degenerative feedback in the circuit, and this feedback serves to reduce and stabilize the gain of the pre-amplifier section 11.

The first push-pull amplifier stage in the pre-amplifier section 11 includes the two PNP transistors 24 and 26. The emitters of these two transistors are inter-coupled through the capacitor 28, as explained above. This capacitor provides a low impedance path between the transistor emitters at the signal frequency. Emitter bias for the transistors 24 and 26 is provided from the positive terminal of the 15-volt source through the resistors 44 and 48.

The second push-pull amplifier stage in the pre-amplifier section 11 includes the two NPN transistors 30 and 32. The collectors of the PNP transistors 24 and 26 are directly connected to the respective bases of the NPN transistors 30 and 32, as described.

In order to limit the base current in the NPN transistors 30 and 32 of the second push-pull amplifier stage, part of the collector current of each of the PNP transistors 24 and 26 of the first push-pull amplifier stage is shunted to the negative 20-volt supply. This is effectuated by the resistors 34 and 36 which serve as stable loads for transistors 24 and 26 with respect to direct current bias, but which do not appreciably shunt the signal frequency from transistors 30 and 32.

The output signal from the pre-amplifier section 11 is fed back in a degenerative sense to the base electrodes of the PNP transistors 24 and 26 through the feedback resistors 52 and 54, as mentioned above. Because the gain of the two push-pull amplifier stages in the pre-amplifier section 11 is relatively high, the over-all gain of the pre-amplifier section 11 is approximately equal to the ratio of the resistors 52, 22 and 54, 20. This circuit arrangement makes the gain of the pre-amplifier section 11 extremely stable and independent of the individual gains of the push-pull amplifier stages.

The clock read amplifier portion 13 of the illustrated amplifier circuit responds to the amplified sinusoidal clock signal from the pre-amplifier section, and the latter amplifier portion 13 amplifies and shapes the clock signal into sharp discrete clock pulses.

The sinusoidal signal from the pre-amplifier section 11 may have a frequency, for example, of 80 kilocycles; and the output clock pulses $C_p$ produced by the clock read amplifier may be in the form of a series of sharp, discrete pulses having a repetition frequency corresponding to the frequency of the sinusoidal clock signal. In a constructed embodiment of the invention, each clock pulse $C_p$ produced by the clock read amplifier has a duration of 4 microseconds, and amplitude of 15 volts, and a rise time of the order of 20 nanoseconds.

The sinusoidal clock signal $C_p$ entering the clock read amplifier portion 13 of the amplifier circuit from the pre-amplifier section 11 is applied to the base of the transistor 106 through the above-mentioned series-resonant circuit, and which includes the capacitor 102 and inductance coil 104.

This series-resonant circuit is tuned to the frequency of the clock signal, and it has a sufficiently high quality factor to discriminate against random noise signals, and the like. The series-resonant circuit serves, therefore, to prevent such noise signals from reaching the base of the transistor 106. The series-resonant circuit is effective, therefore, to eliminate spurious timing variations from the output clock pulses which could otherwise be caused by noise disturbances and the like.

However, the quality factor of the series-resonant tuned circuit 102, 104 is sufficiently low so that slight frequency changes in the sinusoidal clock signal $C_p$ from the pre-amplifier section 11, due to corresponding slight variations in the speed of the associated memory, will not cause the output clock pulses $C_p$ to be attenuated to any material extent because of the series-resonant circuit.

The positive half-cycles of the sinusoidal clock signal $C_p$, applied through the series-resonant circuit 102, 104 to the base of the transistor 106, drive the transistor to its non-conductive state; whereas, the negative half-cycles of the clock signal drive the transistor 106 to its fully conductive, saturated condition. The diode 108 is provided in the input circuit of the transistor 106, so that the input circuit will present the same input impedance to both the positive and negative half-cycles of the clock signal $C_p$ passed through the series-resonant circuit 102, 104 to the base of the transistor 106.

When the transistor 106 is driven to its non-conductive state, the capacitor 112, included in the differentiating network formed by the capacitor and its associated resistors, charges through the collector resistor 110 and through the load resistor 114, thereby providing a negative-going voltage at the anode of the diode 116. This negative voltage is not passed through the diode because of its negative polarity.

When the transistor 106 is driven to its fully conductive condition, the differentiating network capacitor 112 discharges through the transistor 106 and through the load resistor 114. The resulting positive-going voltage spike applied to the anode of the diode 116 is passed through the diode to the base of the transistor 118, and it drives the transistor 118 to its non-conductive state.

The transistors 118 and 134 are connected as a one-shot monostable multivibrator 135. When the one-shot multivibrator 135 is in its stable state, the transistor 118 is fully conductive and the transistor 134 is non-conductive.

The connection through the potentiometer 122 and resistor 120 to the negative terminal of the 20-volt direct voltage source provides a bias for the base of the transistor 118. The transistor 134 is held non-conductive by the positive voltage on its base. This positive voltage is produced by the voltage divider action of the resistors 128 and 136, in conjunction with the transistor 126. The transistor 126 is slightly conductive during the stable state of the monostable multivibrator 135, during which the transistor 134 is non-conductive, and transistor 118 is fully conductive.

When the diode 116 passes a positive voltage spike to the base of the transistor 118 of the multivibrator 135 to render the transistor 118 non-conductive, the resulting drop in its collector voltage drives the transistor 126 into its fully conductive state. This increased conductivity of the transistor 126 drives the other transistor 134 of the multivibrator 135 to its fully conductive state due to the resulting drop in the bias voltage on the base of the latter transistor.

A negative pulse is produced at the output terminal $C_p$ in response to the action described in the preceding paragraph. The capacitor 142 between the collector of the transistor 134 and the base of the transistor 118 in the multivibrator 135 begins charging when the transistor 118 is rendered non-conductive, and the capacitor 142 holds the transistor 118 non-conductive until its charge reaches a particular level, and after a particular time interval of, for example, 4 microseconds. When the charge on the capacitor 142 is at a level sufficient to permit the transistor 118 to conduct, the multivabrator 135 rapidly reverts to its stable state. The resulting reduction in the current of the transistor 126 terminates the output pulse $C_p$. The duration of the output pulse may be controlled by adjusting potentiometer 122 so as to alter the charging time of capacitor 142.

Therefore, in the manner described above, a sharp negative going output clock pulse is formed at the output terminal $C_p$ each time the sinusoidal input clock signal reaches its negative peak.

The invention provides, therefore, an improved clock read amplifier circuit in which the clock signals sensed by the read head 16 are amplified in a highly stable pre-amplifier section, and the resulting clock signals are introduced to a subsequent clock read amplifier which serves to further amplify the signals and transform them into sharp discrete output pulses.

The system and circuit illustrated and described herein is particularly advantageous in its immunity to noise disturbances and the like, so that it is assured that such disturbances will have no effect on the timing of the clock pulses, and on the timing of the computer in which they are used.

While a particular embodiment of the invention has been shown and described, modifications may be made, and it is intended in the following claims to cover all such modifications as fall within the scope of the invention.

What is claimed is:

1. In an amplifier circuit for amplifying a sinusoidal input signal and which includes a two-stage push-pull pre-amplifier for said sinusoidal input signal and including a pair of pnp transistors and circuitry interconnecting said transistors in push-pull relationship to form a first stage for said pre-amplifier, a pair of npn transistors and circuitry connecting said npn transistors in push-pull relationship and in series circuit with respective ones of said pnp transistors to form a second stage for said pre-amplifier and producing an amplified sinusoidal output signal, the combination of: a further transistor including input and output electrodes; coupling circuit means including a series-resonant network comprising an inductance coil and a capacitor connected in series and connected to the input electrodes of said further transistor for introducing the sinusoidal output signal from said second pre-amplifier stage to said further transistor to drive said further transistor to a saturated condition and to a non-conductive condition so as to cause said further transistor to develop a square wave output signal, said series-resonant network being constructed to have a quality factor of a value sufficient to discriminate against random noise signals, and the like, and yet to pass the sinusoidal output signal from said second pre-amplifier stage substantially unattenuated in the presence of slight variations in the frequency thereof; a differentiating circuit coupled to the output electrodes of said further transistor and responsive to the square wave output signal therefrom for producing positive-going and negative-going spike signals corresponding to the peaks thereof; trigger circuit; circuit means coupling said differentiating circuit to said trigger circuit for introducing said spike signals of at least one polarity to said trigger circuit to actuate said trigger circuit; and an output circuit coupled to said trigger circuit for producing discrete output pulses in response to the actuation of said trigger circuit by said spike signals.

2. The amplifier circuit defined in claim 1 and which includes degenerative feedback resistor means in said pre-amplifier connecting said npn transistors back to said pnp transistors.

3. The amplifier circuit defined in claim 1 and which includes a direct current limiting resistor means connected in shunt with respective ones of said NPN transistors for limiting the direct current therein affecting said sinusoidal signal to any appreciable extent.

4. The amplifier circuit defined in claim 1 in which said trigger circuit is a monostable multivibrator.

References Cited by the Examiner

UNITED STATES PATENTS

| | | | |
|---|---|---|---|
| 2,467,777 | 4/49 | Rajchman et al. | 328—140 |
| 2,861,258 | 11/58 | Walsh et al. | 370—174 |
| 2,892,045 | 6/59 | Aronson | 330—15 |
| 3,036,274 | 5/62 | Greatbatch | 330—15 |
| 3,040,189 | 6/62 | Cramer | 307—88.5 |
| 3,065,362 | 11/62 | Benson | 307—88.5 |

OTHER REFERENCES

Pub. I. "Drum Read Amplifier," in IBM Technical Disclosure Bulletin, vol. 2, No. 6 dated April 1960, pages 93–94.

ARTHUR GAUSS, *Primary Examiner.*